(12) United States Patent
Robbins et al.

(10) Patent No.: US 7,194,209 B1
(45) Date of Patent: Mar. 20, 2007

(54) INTERFERENCE RESISTANT INFRARED EXTENSION SYSTEM

(75) Inventors: Michael Stuart Robbins, Los Angeles, CA (US); Richard May, Camarillo, CA (US)

(73) Assignee: Xantech Corporation, Sylmar, CA (US)

(*) Notice: Subject to any disclaimer, the term of this patent is extended or adjusted under 35 U.S.C. 154(b) by 144 days.

(21) Appl. No.: 10/646,634

(22) Filed: Aug. 21, 2003

Related U.S. Application Data

(60) Provisional application No. 60/408,138, filed on Sep. 4, 2002.

(51) Int. Cl.
*H04B 10/00* (2006.01)
(52) U.S. Cl. .................. 398/127; 398/128; 398/130
(58) Field of Classification Search .............. 398/124, 398/127–128, 130, 182, 160, 202–214
See application file for complete search history.

(56) References Cited

U.S. PATENT DOCUMENTS

| | | | |
|---|---|---|---|
| 3,725,888 A * | 4/1973 | Solomon | 340/522 |
| 3,727,061 A * | 4/1973 | Dworkin | 398/98 |
| 3,928,760 A * | 12/1975 | Isoda | 398/131 |
| 4,509,211 A | 4/1985 | Robbins | 455/603 |
| 4,626,848 A | 12/1986 | Ehlers | 340/825.69 |
| 5,539,393 A * | 7/1996 | Barfod | 340/825.52 |
| 6,107,938 A * | 8/2000 | Du et al. | 340/825.72 |
| 6,114,684 A * | 9/2000 | McGuire | 250/208.2 |
| 6,424,096 B1 | 7/2002 | Lowe et al. | 315/185 |
| 6,430,358 B1 | 8/2002 | Yuen et al. | 386/83 |
| 6,433,927 B1 * | 8/2002 | Nyman et al. | 359/343 |
| 6,434,644 B1 | 8/2002 | Young et al. | 710/63 |
| 6,483,622 B1 * | 11/2002 | Motohashi | 398/128 |
| 6,590,682 B1 * | 7/2003 | Hamilton | 398/139 |
| 6,677,259 B2 * | 1/2004 | Goto et al. | 501/4 |

* cited by examiner

*Primary Examiner*—Dzung Tran
(74) *Attorney, Agent, or Firm*—Hogan & Hartson LLP

(57) ABSTRACT

An interference resistant infrared receiver and extension system is disclosed. A receiver in accordance with the present invention comprises at least one infrared photodetector configured to detect impinging infrared light of a desired wavelength, an amplifier, coupled to the at least one infrared photodetector, for amplifying an electrical signal generated by the at least one infrared photodetector, and a bandpass filter, coupled to the at least one infrared photodetector, wherein the desired impinging infrared light passes through the bandpass filter before impinging on the at least one infrared photodetector, wherein the bandpass filter is configured to pass desired impinging infrared light and block undesired impinging wavelengths of light.

9 Claims, 5 Drawing Sheets

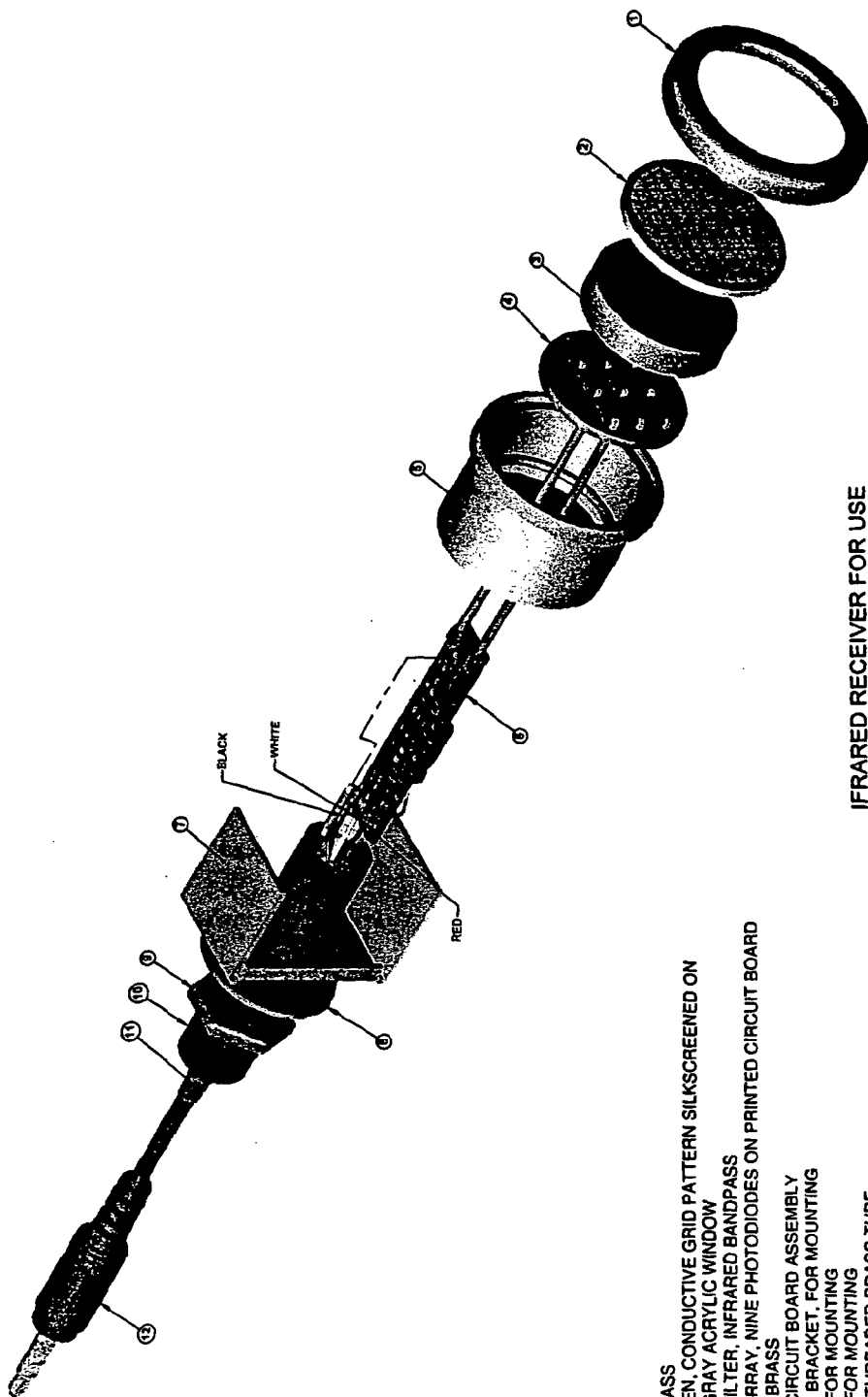

FIG. 4

IFRARED RECEIVER FOR USE
WITH PLASMA SCREENS,
DAYLIGHT AND FLUORESCENT LAMPS

1- BEZEL, BRASS
2- EMI SCREEN, CONDUCTIVE GRID PATTERN SILKSCREENED ON SMOKED GRAY ACRYLIC WINDOW
3- OPTICAL FILTER, INFRARED BANDPASS
4- SENSOR ARRAY, NINE PHOTODIODES ON PRINTED CIRCUIT BOARD
5- HOUSING, BRASS
6- PRINTED CIRCUIT BOARD ASSEMBLY
7- CLAMPING BRACKET, FOR MOUNTING
8- WASHER, FOR MOUNTING
9- HEX NUT, FOR MOUNTING
10- HOUSING, THREADED BRASS TUBE
11- CABLE AND STRAIN RELIEF
12- PLUG, THREE CONDUCTOR

INTERFERENCE RESISTANT INFRARED EXTENSION SYSTEM

CROSS REFERENCE TO RELATED APPLICATIONS

This application claims the benefit under 35 U.S.C. § 119(e) of U.S. provisional application Ser. No. 60/408,138, filed Sep. 4, 2002, entitled "INTERFERENCE RESISTANT INFRARED EXTENSION SYSTEM," by inventors Michael Stuart Robbins et al., which application is incorporated by reference herein in its entirety.

BACKGROUND OF THE INVENTION

1. Field of the Invention

The field of the invention generally relates to infrared control systems and in particular to such systems and components thereof that are interference resistant.

2. Description of the Related Art

Infrared ("IR") control systems are increasingly being employed to govern or otherwise manipulate a wide spectrum of user interactive home and office electrical and electromechanical components and appliances. Today, almost all conventional audio and video components, such as televisions and stereo equipment as well as more recently developed technologies such as satellite dish tuners, digital video disc players (DVD players), and electronic video recorders include IR control systems. Moreover, such systems are increasingly being used to govern the function of home and office fixtures, such as window blinds and lighting; mechanical systems, such as heating, ventilation and air conditioning; and even traditional appliances, such as automated coffee machines and dishwashers.

IR control systems are now so commonly employed, that a casual stroll through a contemporary home or office environment would no doubt reveal numerous IR remote controls scattered about, virtually in every room. Although offering much in the way of convenience to the user, the success and acceptance by the consumer of IR control systems has ironically created derivative inconveniences.

For example, one might only recall the number of times a remote control for the television was mistakenly employed, without success, to control the video player or visa-versa. One reason for the lack of operability is that manufacturer supplied IR controls are typically narrow-band tuned and therefore product or component specific. An example of such a tuned system is described in U.S. Pat. No. 3,928,760 issued to Mikio Isoda, which is hereby incorporated by reference. As described in U.S. Pat. No. 3,928,760, a traditional narrow-band tuned IR remote control system employs a handheld transmitter and a stationary receiver. The transmitter comprises a modulating circuit and an electroluminescent diode, which upon being energized emits short pulses of IR light encoded with data. The wavelength of the IR light emitted is defined by the inherent characteristics of the electroluminescent diode, whereas, the modulating circuit governs the modulation or frequency (e.g., 40 KHz) of the light emitted from the diode. The receiver comprises a detector, which detects impinging IR light signals and an amplifier. The amplifier is "tuned" or configured to respond to the frequency of the light emitted from the diode (e.g., 40 KHz) and functions to amplify and transmit that signal to additional control circuitry, which demodulates the data stream and controls the operation of the device. Consequently, because manufacturers typically employ IR control systems that are tuned on a product-by-product basis to a chosen narrow-band frequency, a tremendous amount of variation exists among control systems.

The inability to control a component outside the line-of-site or beyond the transmission range of the component's IR receiver—such as when the component is in another room, represents yet another inconvenience to the user. Recognition of the foregoing inconveniences has driven the industry to develop new technologies.

For example, universally adaptable IR remote control transmitters, such as that disclosed in U.S. Pat. No. 4,626, 848 issued to Raymond G. Ehlers, which is hereby incorporated by reference, facilitate the transmission of IR signals having suitable frequency and wavelength to be capable of controlling numerous components made by different manufacturers. As such, the inconvenience of seeking out multiple controllers may be significantly alleviated.

In addition, IR extension or repeater systems, such as that disclosed in U.S. Pat. No. 4,509,211 to Michael S. Robbins, which is hereby incorporated by reference, have also significantly improved the usability of IR control systems. IR extension or repeater systems are capable of allowing the user to control one or more various components, even though its physical location is remote or outside the line-of-site or range of the transmitter, thereby providing a remote link to the component. They are generally comprised of a receiver, capable of detecting the IR signal and amplifying the signal, and a transmitter, which "repeats" or retransmits the signal, for example into another room, thereby "extending" or "repeating" the signal.

Over the years, such IR repeater systems have found wide acclaim among consumers. So much so that it is not uncommon for contractors to install such systems into new and remodeled homes and offices, as was the case for indoor plumbing and electrical wiring at the turn of the twentieth century.

Despite these improvements, one shortcoming that has consistently plagued the industry from achieving the full benefits of IR control has been the stark absence of a suitable generic or wide-band IR receiver capable of being used in extension or repeater systems. That is, an IR receiver that is both capable of detecting a wide-band of IR frequencies and wavelengths so as to be compatible with a wide variety of IR controlled components while maintaining sufficient selectivity so as to be operable in the presence of conventional IR noise or interference.

While in the past concern relating to IR noise was generally limited to ambient lighting such as sunlight or artificial light sources, such as fluorescent lamps, the IR emission from plasma televisions, now so readily found in homes and offices, has compounded the concern. That is so, because not only do plasma displays have the capability of emitting a significant amount of IR radiation, they also are often positioned in close proximity to extension or repeater systems, thereby exacerbating their effect.

As a result, with the advent of plasma televisions and the proliferation of multitudes of IR controlled components and appliances, the industry and users alike have for years been frustrated with the absence of a suitable interference resistant broadband receiver for use in conventional IR control systems.

It can be seen, then, that there is a need in the art for a wideband IR receiver that is resistant to interference from stray IR radiation. It can also be seen that there is a need in the art for a wideband IR receiver that is resistant to stray IR radiation interference that can be utilized in a repeater configuration.

SUMMARY OF THE INVENTION

To minimize the limitations in the prior art, and to minimize other limitations that will become apparent upon reading and understanding the present specification, the present invention discloses an interference resistant IR extension system that can be utilized in a repeater configuration.

An apparatus in accordance with the present invention comprises at least one infrared photodetector configured to detect impinging infrared light of a desired wavelength, an amplifier, coupled to the at least one infrared photodetector, for amplifying an electrical signal generated by the at least one infrared photodetector, and a bandpass filter, coupled to the at least one infrared photodetector, wherein the desired impinging infrared light passes through the bandpass filter before impinging on the at least one infrared photodetector, wherein the bandpass filter is configured to pass desired impinging infrared light and block undesired impinging wavelengths of light.

A method in accordance with the present invention comprises detecting an optical communication signal, converting the optical communication signal to an electrical signal, amplifying the electrical signal, and filtering the optical communication signal prior to detecting the optical communication signal, wherein a desired optical communication signal is substantially converted to an electrical signal while interfering signals are substantially prevented from being converted to an electrical signal.

It is an object of the present invention to provide a wideband IR receiver that is resistant to interference from stray IR radiation. It is another object of the present invention to provide a wideband IR receiver that is resistant to stray IR radiation interference that can be utilized in a repeater configuration.

BRIEF DESCRIPTION OF THE DRAWINGS

Referring now to the drawings in which like reference numbers represent corresponding parts throughout:

FIG. 4 is an illustration of an exploded view of the receiver component of the IR extension system in accordance with the preferred embodiment.

DETAILED DESCRIPTION OF THE PREFERRED EMBODIMENTS

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

System Overview

Figure 1:
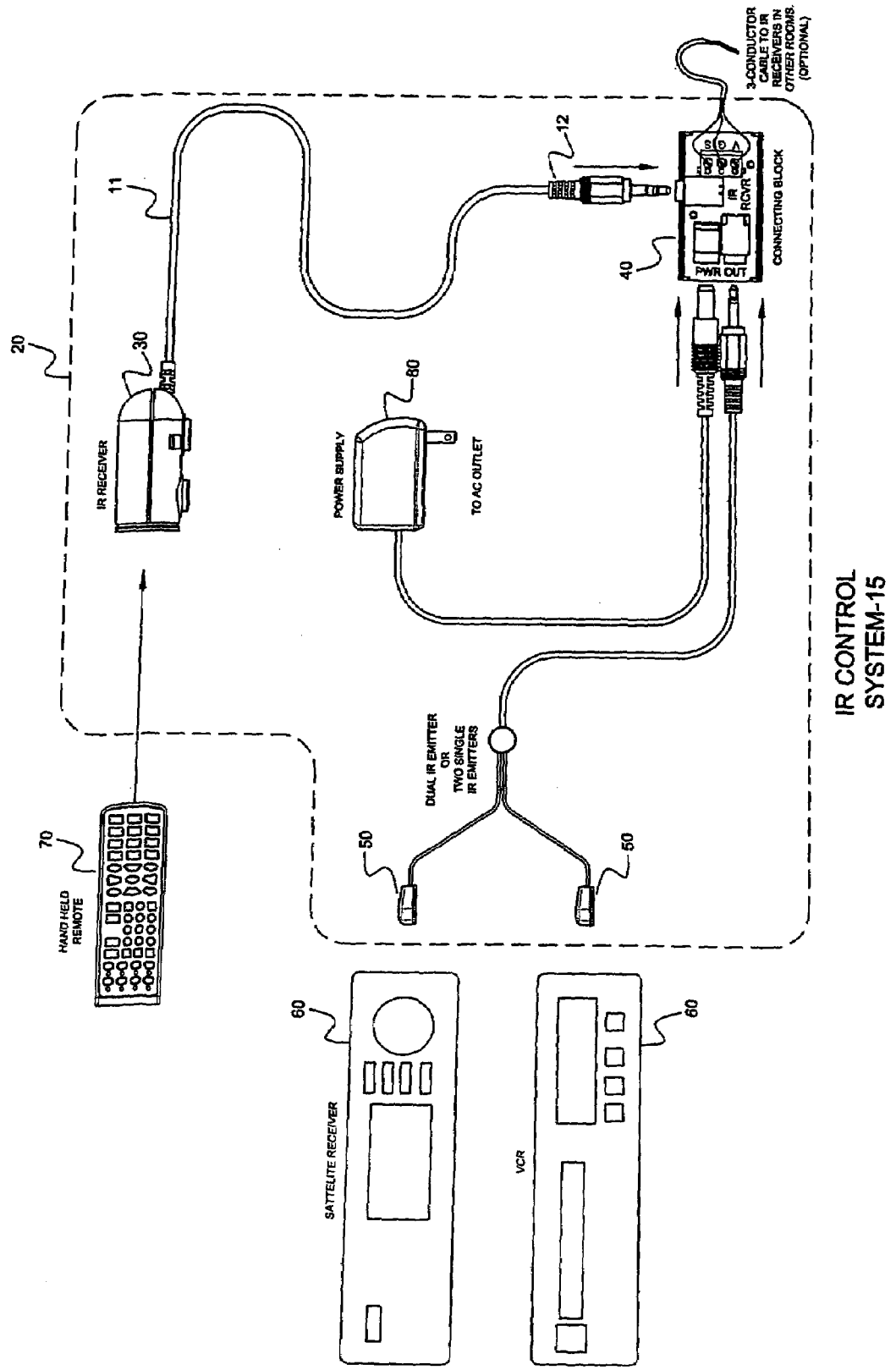
FIG. 1 is an illustration of an IR control system comprising an IR extension system in accordance with a preferred embodiment.

FIG. 1 illustrates an IR control system 15 comprising one or more IR control transmitters, such as a hand held IR remote 70, an IR extension system 20, and one or more electrical or electromechanical IR controlled appliances or components 60. The IR extension system 20 comprises an IR receiver 30, a connecting block or router component 40, and one or more IR emitters 50 adapted to emit IR light suited to communicate with the IR controlled appliances or components 60. Light emitters 50 may operate at different wavelengths, if desired.

As illustrated in FIG. 1, the connecting block 40 preferably includes a power supply connection 80 adapted to convey power to the IR extension system 20. The connecting block 40 is preferably configured to interconnect the various elements of the IR control system 15 including, if so employed, additional IR receivers 30 in other locations.

In operation, an IR signal emitted by an IR transmitter (e.g., IR handheld remote control) 70 impinges upon an IR receiver 30. The IR receiver 30 detects the impinging IR signal, converts the IR signal into an electrical signal, amplifies the electrical signal, and transmits or conveys the amplified signal to the connector block 40, such as, for example, via a multiconductor cable 11 and plug connection 12. The connector block 40 receives the electrical signal from the IR receiver 30 and preferably routes the electrical signal to each emitter 50, which converts the electrical signal to an IR signal capable of controlling one or more of the components 60. In this manner, the original IR signal from the IR remote 70 can be conveyed in the form of an electrical signal as far as necessary and then reproduced or regenerated into an IR signal capable of controlling a component 60, which the user seeks to control.

Block Diagram

Figure 2:
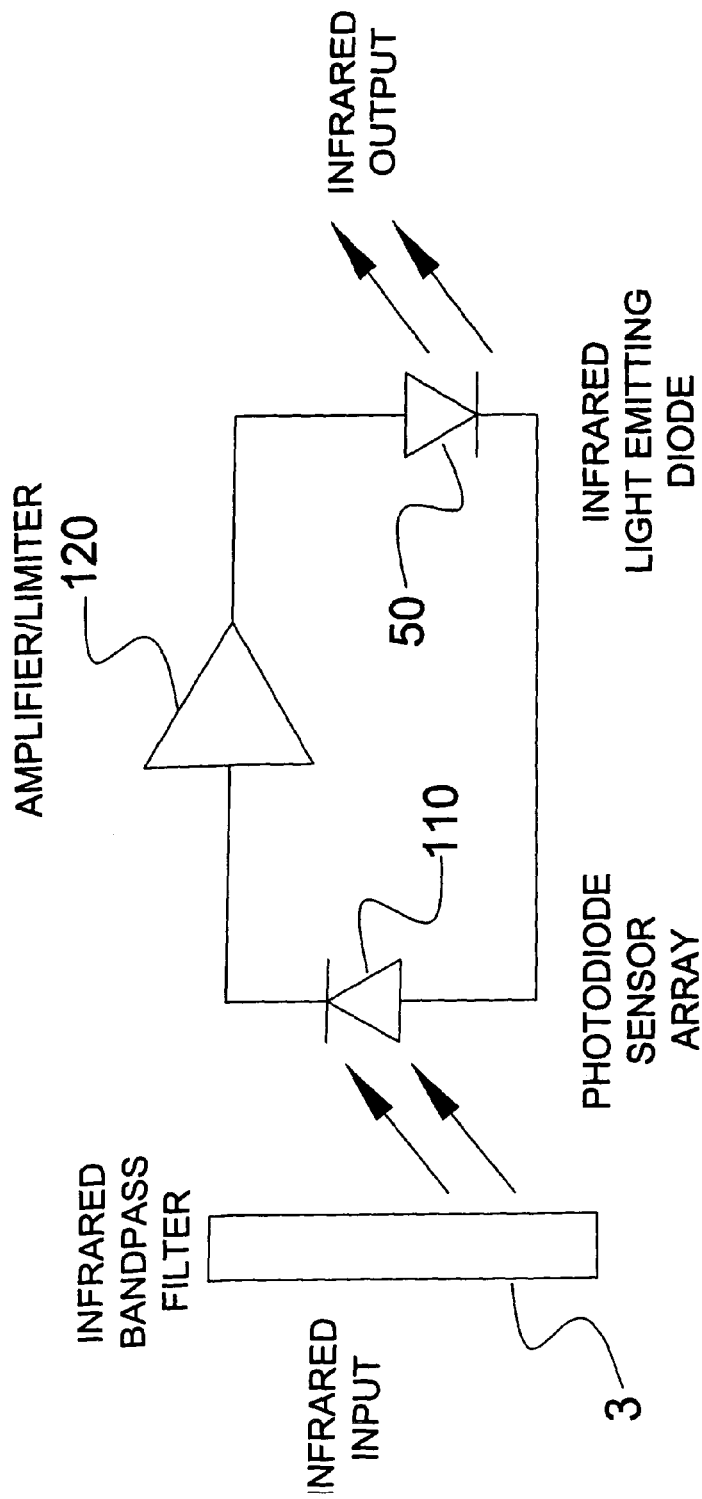
FIG. 2 is an illustration of a simplified electrical block diagram of an IR extension system in accordance with the preferred embodiment.

FIG. 2 illustrates a simplified electrical block diagram of a preferred embodiment of the IR extension system 20 in accordance with the preferred embodiment illustrated in FIG. 1. The IR extension system 20 includes the following active elements: an IR bandpass filter 3; one or more sensors 110, which may, for example, be comprised of one or more silicon PIN photodiodes capable of detecting optical energy within a defined spectral range that passes through the filter 3. In a multiple sensor configuration, multiple sensors (including, optionally, all of the sensors) may be imprinted together on a single die or each sensor from a respective die. The IR Extension System preferably further includes a broadband amplifier/limiter 120, and as previously noted one or more IR emitters 50 comprising, in the preferred embodiment, of one or more IR light emitting diodes.

The IR bandpass filter 3 is designed to provide an optical bandpass characteristic suitable for transmitting a desired IR optical wavelength while filtering out undesirable IR noise or interference prior to the conversion of the optical wavelengths to electrical signals. Although electrical or electromechanical components employ various IR signal wavelengths, the inventors have found that a significant number of IR transmitters 70 presently employed in numerous home and office appliances and components employ an IR signal having a center wavelength between about 920 and about 980 nanometers ("nm") with a significant subset of those components employing IR signals having a center wavelength between about 940 nm and about 960 nm.

Thus, it is preferable that the center wavelength of the IR bandpass filter 3 be between about 920 nm and about 980 nm, even more preferably between about 930 nm and about 970 nm, yet even more preferably between about 940 nm and about 960 nm, yet even more preferably between about 945 nm and about 955 nm, and yet even more preferably between about 948 nm and about 952 nm.

The bandwidth characteristics of the filter 3 is configured or designed to be suitable for transmission of a desired range of IR wavelengths. The term "bandwidth" as it relates to an IR bandpass filter 3 element is defined as the smallest range of wavelengths constituting a band, within which a particular signal can be transmitted at a correlated percentage of the peak transmission intensity of the filter 3.

Figure 5:
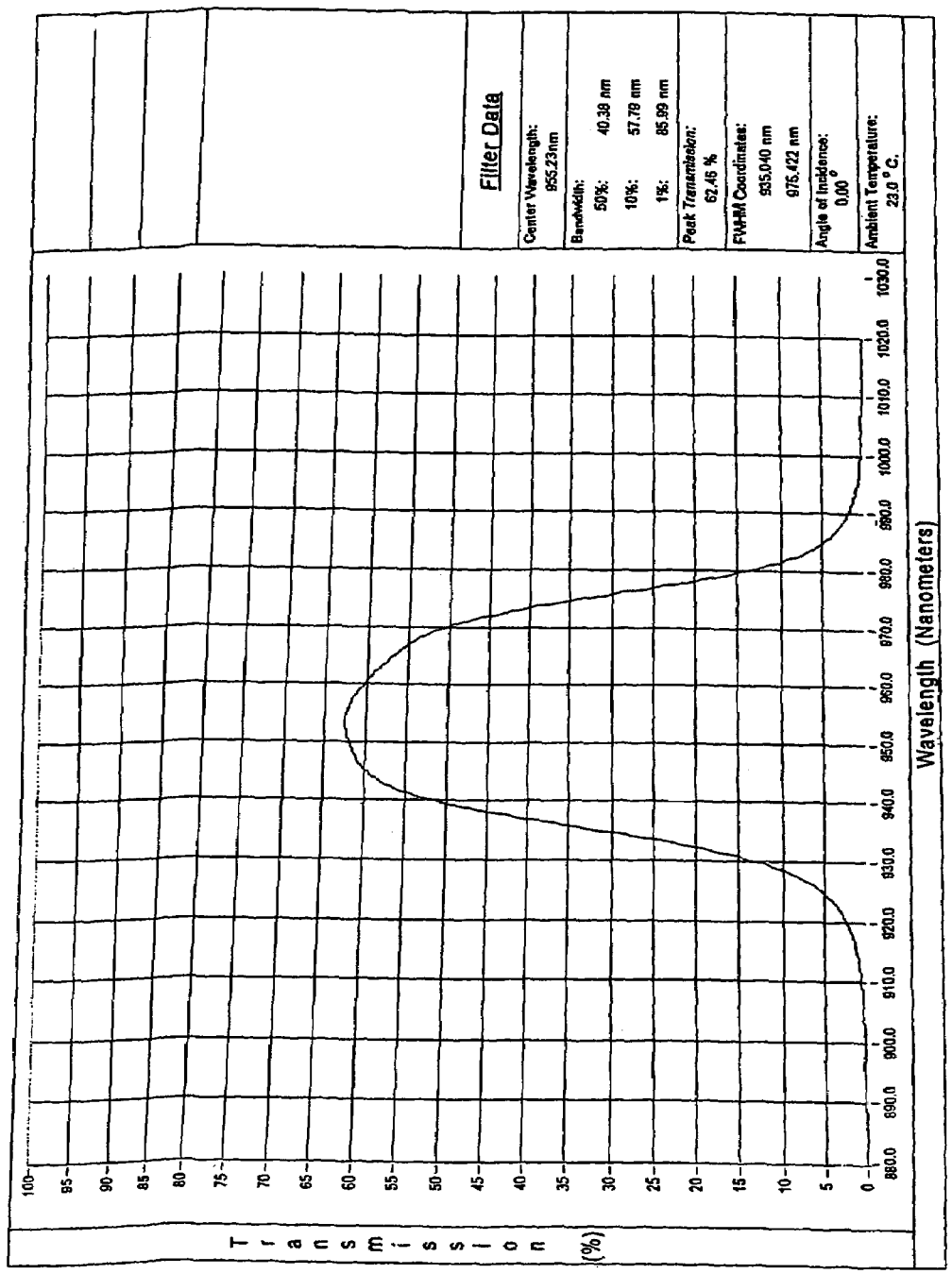
FIG. 5 is a graphical representation of transmission percentage verses wavelength for an IR band-pass filter of the IR extension system in accordance with the preferred embodiment.

For example, illustrated in FIG. 5 is a graphical representation of transmission intensity percentage verses wavelength for a preferred embodiment of an IR bandpass filter 3. As noted on FIG. 5, the peak intensity of this filter is 62.46%. Thus, a 50% bandwidth is the range of wavelengths that are transmitted with an intensity of 31.23% or more, which, as noted on the graph, constitutes a bandwidth of 40.38 nm. Applicants have found that in order to provide suitable IR interference filtering in conventional environments (such as from one or more of the following sources: plasma display screens, fluorescent lamps and/or sunlight) that it is preferable that the filter 3 have an 80% bandwidth that is no less than about 10 nm. Applicants have also found that it is preferable that the filter 3 have a 50% bandwidth that is no less than about 20 nm and that the 50% bandwidth of the filter 3 encompass the about 940 nm to about 960 nm wavelength range.

Figure 3:
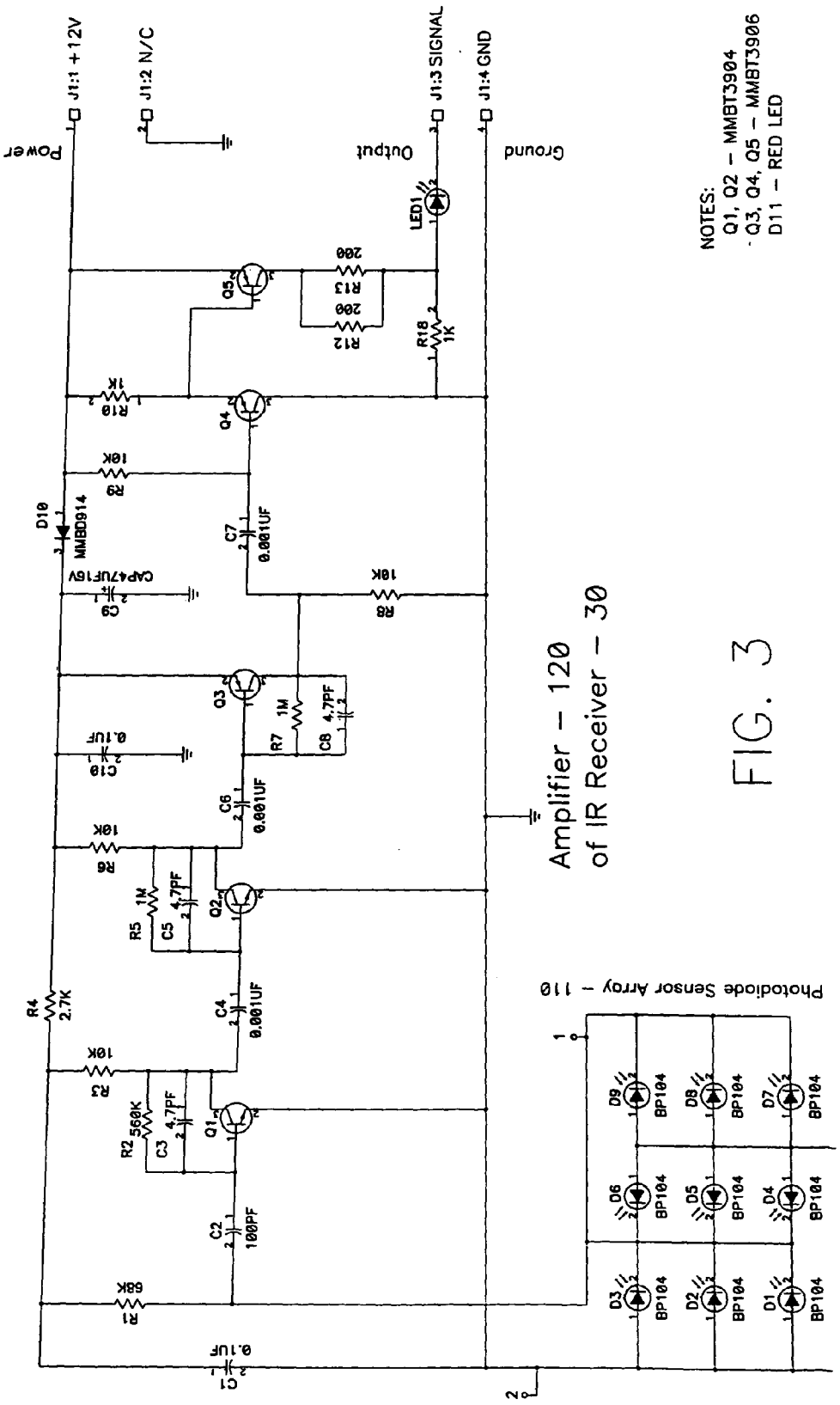
FIG. 3 is an illustration of a simplified electrical schematic diagram of the detector and amplification circuitry of an IR receiver of the IR extension system in accordance with the preferred embodiment.

As no known filters 3 have 100% intensity transmission, the placement of a filter 3 in front of the photodiode sensor reduces the sensitivity of the receiver 30. Depending on the characteristics of the filter 3, the reduction in sensitivity may be significant. To offset this reduction, multiple photodiodes 110 (e.g., as illustrated in FIGS. 3 and 4 of the preferred embodiment is a 3 by 3 array of 9 photodiodes) may be employed so as to provide a larger photodiode sensor 110 area. Alternatively or in conjunction with additional photodiodes 110 or a greater sensing surface area, the sensitivity of the amplifier/limiter 120 element is increased to a suitable level so as to sense and amplify (i.e., increase the level of electrical signals generated by the photodiode sensor 110 upon detection of impinging light transmitted through the filter 3) with suitable fidelity of weaker signals from the IR detection component (e.g., photodiode sensor 110).

It is contemplated that in a preferred embodiment, the amplifier/limiter 120 includes an amplifier circuit that is designed to be inherently self-limiting so that all but the weakest signals received from the photodiode sensor(s) 110 will be amplified to the same amplitude when lighting the IR emitters 50. The benefit of such a self-limiting amplifier circuitry is that a weak signal (e.g., from a hand held IR remote control 70 being employed a significant distance from the receiver 30 or one that has low power batteries), once detected would nevertheless be amplified to the same level as a stronger signal (e.g., perhaps from the IR remote control 70 being employed at a much closer distance to the receiver 30 or one having a stronger luminescence emission). Other electronic devices and systems refer to this feature as an Automatic Gain Control (AGC) amplifier, and such terminology can be utilized with the present invention.

In order to capture a sufficiently broadband of carrier frequencies, it is preferred that the amplifier 120 be configured to respond (i.e., receive and amplify electrical signals) to one or more of the following signal frequencies 32 KHz, 40 KHz, and 56 KHz. It is even more preferable that the amplifier 120 be configured to respond to two or more of the following signal frequencies 32 KHz, 40 KHz, and 56 KHz. Yet, it is even more preferable that the amplifier 120 be configured to respond to all of the following signal frequencies 32 KHz, 40 KHz, and 56 KHz, and yet even more preferably all signal frequencies between about 30 KHz and about 70 KHz.

It is to be understood that the amplifier 120 element may comprise a single component or multiple components. It may be un-tuned, tuned to a single frequency or range of frequency, or be comprised of a multi-tuned component capable of responding to two or more discrete signal frequencies or ranges of frequencies.

Electrical Schematic

FIG. 3 is an illustration of an example of a simplified electrical schematic diagram of the detection and amplification circuitry of a preferred receiver 30 employing a self limiting amplification circuit, as previously described and array of nine (9) photodiodes 110, enumerated as D1–D9, which detect the infrared signal. A coupling capacitor identified as "C2" is employed to limit the low frequency response of the amplifier 120 so that signals from common, tube-type, fluorescent lamps are minimized as these signals are often of low frequency. Transistors enumerated as Q1, Q2 and Q3 and the associated resistors enumerated as R2–R8 and capacitors enumerated as C3–C7 form an AC-coupled voltage amplification circuit, which functions to increase the amplitude of the detected signal. Transistors enumerated as Q4 and Q5 and the associated resistors enumerated as R9 and R10 form a switch which drives the IR emitters 50 by turning them on and off in response to the received signal. Notably, the configuration of the preferred embodiment of the amplifier/limiter 120 component illustrated in FIG. 3 is configured to respond to carrier frequencies in the range of about 30 KHz to about 70 KHz, thereby suited to respond to a broadband of carrier frequencies. Also shown is light-emitting-diode, identified as "LED1", in an electrical communication with the amplification circuitry to provide a visual indication of the operation of the IR receiver 30.

Mechanical Packaging

FIG. 4 illustrates an exploded view of a preferred construction of a receiver 30 of the IR extension system 20 in accordance with the preferred embodiment. As illustrated and described in FIG. 4, the receiver 30 comprises a bezel 1 configured to be coupled to a compartment or housing 5, which is configured to house an electro magnetic interference (EMI) screen 2, an IR bandpass filter 3 and a 3×3 array 4 of nine (9) photodiode sensors 110 electrically connected in parallel to the remaining elements of the receiver 30 as illustrated and described in FIG. 3. A printed circuit board assembly 6 is in electrical communication with the array 4 and preferably includes the amplification circuitry of the amplifier/limiter 120 as previously described.

The EMI screen 2 in a preferred construction is comprised of a conductive grid silk screened on a smoked grey acrylic window. It is configured to block radio frequency noise from affecting the electrical circuitry of the receiver 30. In a preferred embodiment, the IR bandpass filter 3 is comprised of the filter illustrated and described in FIG. 5 discussed above.

Alternative Embodiments and Optional Configurations

Although the present invention is described herein in terms of a preferred embodiment, other embodiments can be utilized without departing from the scope of the present invention. For example, and not by means of limitation, although the present invention has been described herein as an infrared detector and emitter system, visible or other wavelengths of light can be used without departing from the scope of the present invention. Further, a larger or smaller number of additional photodiodes 110 could be utilized to detect the incoming desired signal, or an array of photodiodes 110 physically located on a single die could be used instead of discrete components.

The entire amplifier/photodetector system could also be manufactured on a single chip instead of having discrete components if desired. Further, the bandpass of the filter can have multiple bandpasses or a non-uniform bandpass shape if desired.

CONCLUSION

In summary, the present invention provides an interference resistant infrared receiver and extension system. A receiver in accordance with the present invention comprises at least one infrared photodetector configured to detect impinging infrared light of a desired wavelength, an amplifier, coupled to the at least one infrared photodetector, for amplifying an electrical signal generated by the at least one infrared photodetector, and a bandpass filter, coupled to the at least one infrared photodetector, wherein the desired impinging infrared light passes through the bandpass filter before impinging on the at least one infrared photodetector, wherein the bandpass filter is configured to pass desired impinging infrared light and block undesired impinging wavelengths of light.

A method in accordance with the present invention comprises detecting an optical communication signal, converting the optical communication signal to an electrical signal, amplifying the electrical signal, and filtering the optical communication signal prior to detecting the optical communication signal, wherein a desired optical communication signal is substantially converted to an electrical signal while interfering signals are substantially prevented from being converted to an electrical signal.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. An interference resistant infrared extension system comprising:
    one or more infrared photodetectors configured to detect impinging infrared light having a signal frequency modulated by data;
    an amplifier in electrical communication with said one or more IR photodetectors, wherein said amplifier is tuned to amplify electrical signals generated by said one or more IR photodetectors;
    one or more infrared light emitters in electrical communication with said amplifier, wherein in said one or more infrared light emitters are configured to emit infrared light in response to electrical signals from said amplifier; and
    an infrared bandpass filter configured to filter light impinging on said one or more IR photodetectors, wherein said infrared bandpass filter is configured to have a center wavelength falling within the range of about 920 nm to about 980 nm; an 80 percent bandwidth of approximately 10 nm; and a 50 percent bandwidth of approximately 20 nm.

2. The interference resistant infrared extension system of claim 1, wherein said 50 percent bandwidth of said infrared bandpass filter encompasses the about 940 nm to about 960 nm wavelength range.

3. The interference resistant infrared extension system of claim 1, wherein said amplifier is configured to respond to one or more of the following signal frequencies 32 KHz, 40 KHz, and 56 KHz.

4. An interference resistant infrared receiver, comprising:
    (a) at least one infrared photodetector configured to detect impinging infrared light of a desired wavelength;
    (b) an amplifier, coupled to the at least one infrared photodetector, for amplifying an electrical signal generated by the at least one infrared photodetector; and
    (c) a bandpass filter, coupled to the at least one infrared photodetector,
    wherein the desired impinging infrared light passes through the bandpass filter before impinging on the at least one infrared photodetector, wherein the bandpass filter is configured to pass desired impinging infrared light having a center wavelength within a range used by home and office infrared control systems and block undesired impinging wavelengths of light outside of this range, and wherein the bandpass filter passes light falling within a wavelength range of about 920 nm to about 980 nm, and wherein the bandpass filter has an 80 percent bandwidth about 10 nm wide.

5. The infrared receiver of claim 4, wherein more than one infrared photodetector is used to increase the sensitivity of the receiver to the impinging infrared light.

6. The infrared receiver of claim 5, wherein a sensitivity of the amplifier is increased such that the sensitivity of the receiver is increased with respect to the impinging infrared light.

7. The infrared receiver of claim 4, wherein the bandpass filter has a 50 percent bandwidth about 20 nm wide.

8. The infrared receiver of claim 7, wherein the amplifier further comprises an automatic gain control circuit for accepting impinging infrared light of different intensities and generating electrical signals of substantially similar signal strengths therefrom.

9. The infrared receiver of claim 8, wherein a first infrared light emitter emits light of a first wavelength and a second infrared light emitter emits light of a second wavelength.

* * * * *